Figures 1, 2, 3:
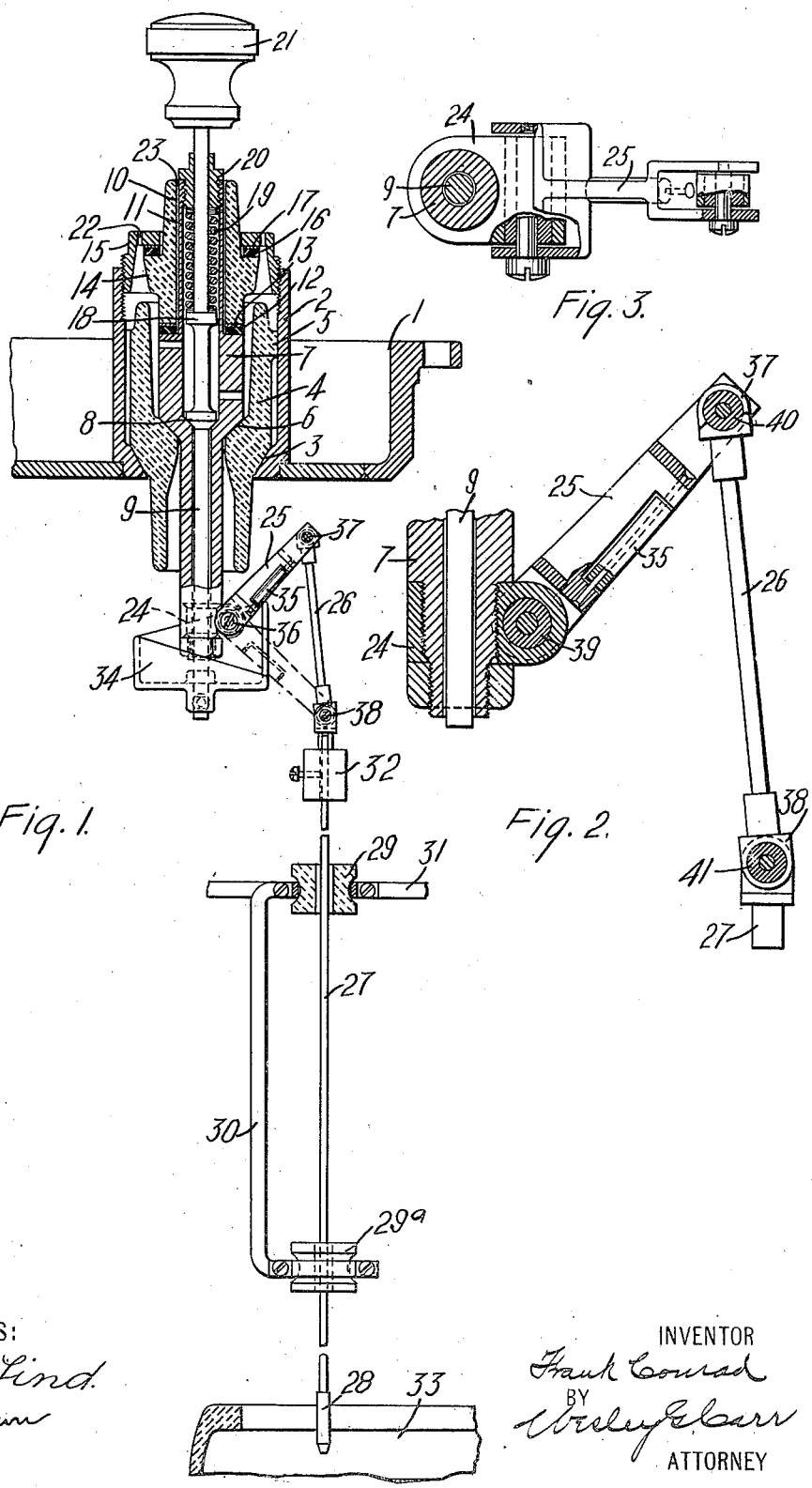

F. CONRAD.
STARTING ELECTRODE FOR VAPOR ELECTRIC DEVICES.
APPLICATION FILED JAN. 30, 1914.

1,194,143.

Patented Aug. 8, 1916.

WITNESSES:

INVENTOR
Frank Conrad
BY
ATTORNEY

UNITED STATES PATENT OFFICE.

FRANK CONRAD, OF SWISSVALE, PENNSYLVANIA, ASSIGNOR TO WESTINGHOUSE ELECTRIC AND MANUFACTURING COMPANY, A CORPORATION OF PENNSYLVANIA.

STARTING-ELECTRODE FOR VAPOR ELECTRIC DEVICES.

1,194,143.

Specification of Letters Patent. Patented Aug. 8, 1916.

Application filed January 30, 1914. Serial No. 815,354.

*To all whom it may concern:*

Be it known that I, FRANK CONRAD, a citizen of the United States, and a resident of Swissvale, in the county of Allegheny and State of Pennsylvania, have invented a new and useful Improvement in Starting-Electrodes for Vapor Electric Devices, of which the following is a specification.

My invention relates to vapor electric devices and particularly to starting electrodes for such devices, and it has for one of its objects to provide improved means whereby a starting electrode may be securely sealed in the casing of a vapor electric device and may be readily operated from the exterior of the device.

A further object of my invention is to provide improved and highly efficient bearings for the frictionally engaging operated parts contained within the casing of a vapor electric device.

The nature of my invention may be best understood by reference to the accompanying drawings in which—

Figure 1 is a general view, partially in elevation and partially in vertical section, of my improved starting electrode. Fig. 2 is a vertical sectional view showing certain of the operating parts of my device in greater detail than in Fig. 1, and Fig. 3 is a plan view of the parts shown in Fig. 2.

Referring now to Fig. 1 of the drawing, a portion of a mercury vapor rectifier is shown having a cover 1 provided with an aperture and with a cylindrical sleeve 2 projecting upwardly therefrom. The sleeve 2 is provided with an internal beveled edge 3 near its union with the cover to constitute a seat for a correspondingly shaped shoulder upon an insulating bushing 4 which extends through the aperture into the casing and which is held loosely in the sleeve 2, being maintained in a substantially central position therein by pads or bosses 5. The bushing 4 is also provided with an inwardly beveled internal seat 6 to coöperate with a similarly shaped external shoulder on a metallic tubular member 7 which is inclosed within the bushing and extends beyond it into the casing. The interior of the tubular member 7 is likewise provided with an inwardly inclined beveled surface upon which a correspondingly shaped enlargement 8 on a rod 9 is adapted to bear. It will thus be observed that three pairs of inwardly inclined surfaces are provided, the purpose of which is to provide intimate contact between the sleeve, the bushing, the tubular member and the rod, thus effectually sealing the aperture in the cover.

I provide means for forcing the described parts into intimate contact with one another, such means comprising a bushing 10 which surrounds a reduced portion 11, of the tubular member 7 and rests upon the enlarged portion thereof; a washer 12 of asbestos or other suitable slightly compressible material interposed between the bushing 10 and the enlarged portion of the tubular member 7 and a protecting steel washer 13. The bushing 10 is provided with a shoulder 14 between which and an exteriorly threaded nut or bushing 15 are clamped an asbestos washer 16 and a steel washer 17. The nut or bushing 15 is screwed into the sleeve 2 to clamp the washers 16 and 17 and 12 and 13 between the adjacent surfaces and the coöperating inclined surfaces in engagement. The rod 9 is provided with a second enlargement 18 above the enlargement 8 and is resiliently forced downward by a spring 19 which bears against the enlargement 18 and which is compressed by an exteriorly threaded nut 20 which is screwed into the upper portion of the tubular member 7.

The outer end of the rod 9 is provided with a knob 21 or other suitable turning means.

It will be observed that spaces are provided between the sleeve, the bushing, the tubular member and the rod to be either partly or wholly filled with mercury, which may be conveniently introduced through apertures 22 and 23 and which insures perfectly gas-tight seals between the parts. I provide openings also in the tubular member 7 through which the mercury may reach the space between the rod 9 and the interior of the tubular member 7.

A collar 24 is fixed to the end of the tubular member 7 which extends into the casing and to this collar is pivoted a lever 25 which is connected by a link 26 to a vertically reciprocable rod 27 having, at its lower end, an electrode 28 which may be of graphite or other suitable material. The rod 27 is supported in a vertical position by bushings 29 and 29ª that are held in a bracket 30 mounted on a support 31 and is provided with a weight 32 which tends to hold the rod 27 and the electrode 28 in their lowest position, in which position the end of the electrode is immersed in the mercury pool 33 which forms the cathode of the rectifier.

The rod 9 carries, at its lower end, a cam 34 which is adapted to coöperate with a roller 35 on the lever 25.

It will be readily understood that, when the parts are in the positions shown in Fig. 1, with the lever 25 in the position indicated by full lines, a slight turn of the knob 21 in a counter-clockwise direction will cause the cam 34 to release the lever 25, thus allowing the electrode 28 to descend into the mercury pool, and that a further turn of the knob 21 in the same direction will cause the cam 34 to raise the lever 25, and consequently the electrode 28, thus drawing an arc between this electrode and the mercury pool.

An important feature of my invention resides in the bearings which I have provided for the lever 25 and the link 26. I have discovered that frictional bearing surfaces of metal are not suitable for use in a high vacuum for the reason that vaporizable lubricants cannot be used, and also for the reason that the small amount of gas occluded in the metal is drawn to the surface of the metal by the vacuum. The transmission of the gaseous particles from within the body of the metal causes the surface of the metal to become roughened, and, therefore, when metal parts are in close frictional contact, the roughening of the surface soon causes binding of the parts. I have overcome this difficulty by providing the frictionally engaging parts of my device with anti-friction bearings, which may conveniently be made of graphite or other forms of carbon. In the device which I have shown and described, I find it necessary to provide such anti-friction bearings at the pivots 36, 37 and 38. These bearings are shown at 39, 40 and 41 in Figs. 2 and 3.

I do not wish to be restricted to the use of carbon bearings, since any non-metallic anti-friction material which is not affected injuriously by mercury is suitable for my purpose. Furthermore, I do not wish to be restricted to the exact structural details which I have shown and described, since it is obvious that many changes may be made therein without departing from the spirit of my invention.

I claim as my invention:

1. A vapor electric device comprising a casing, a vaporizable electrode contained therein, a starting electrode and an operating means therefor having a carbon bearing.

2. A vapor electric device comprising a casing, a vaporizable electrode and a starting electrode contained therein, and means for operating the starting electrode comprising a cam-actuated lever provided with an anti-friction bearing.

3. A vapor electric device comprising a casing, a bushing extending into the casing, a tubular member seated in the bushing and extending through the same into the casing, a rotatable rod seated in and extending through the tubular member, an electrode within the casing, and means actuated by rotation of the said rod to raise and lower the electrode.

4. A vapor electric device comprising a casing, a vaporizable electrode and a starting electrode contained therein and means sealed in and extending through the casing for actuating the starting electrode, said actuating means comprising a lever having a carbon bearing and means controlled from the exterior of the casing for operating the lever.

5. A vapor electric device comprising a casing, a starting electrode, means extending through the casing for operating the starting electrode and means for sealing the operating means in the casing, said sealing means comprising a bushing of insulating material having external and internal seats coöperating respectively with similar seats on the casing and on a tubular member inclosed within the bushing, a rod within the tubular member having an enlarged portion coöperating with an internal seat on the tubular member, and means for forcing the several coöperating parts into gas-tight engagement.

6. A vapor electric device comprising a casing, a starting electrode, means extending through the casing for operating the starting electrode, and means for sealing the operating means within the casing, said means comprising a bushing of insulating material having external and internal inwardly tapered seats coöperating respectively with similar seats on the casing and on a tubular member inclosed within the bushing, a rod within the tubular member and having an enlarged portion coöperating with an internal tapered seat on the tubular member, mercury seals associated with the several pairs of tapered seats, and means for forcing the several coöperating tapered surfaces into gas-tight engagement comprising a spring pressing upon an enlargement on the rod, a second bushing in engagement with the tubular member, and means connected with the casing for forcing the second bushing tightly against the tubular member.

In testimony whereof, I have hereunto subscribed my name this 24th day of Jan. 1914.

FRANK CONRAD.

Witnesses:
WILLIAM BRADSHAW,
B. B. HINES.